US005273410A

United States Patent [19]

Kitaichi et al.

[11] Patent Number: 5,273,410

[45] Date of Patent: Dec. 28, 1993

[54] COMPRESSOR EXHIBITING AN IRON SULFIDE WEAR SURFACE

[75] Inventors: Shoichiro Kitaichi, Yokosuka; Tadao Machida, Tokyo; Shinobu Sato, Yokohama, all of Japan

[73] Assignee: Kabushiki Kaisha Toshiba, Kawasaki, Japan

[21] Appl. No.: 924,578

[22] Filed: Aug. 5, 1992

Related U.S. Application Data

[63] Continuation of Ser. No. 633,993, Dec. 26, 1990, abandoned.

[30] Foreign Application Priority Data

Dec. 28, 1989 [JP] Japan ................................ 1-339730

[51] Int. Cl.[5] ...................... F04C 29/02; F04B 39/02; F16J 1/01

[52] U.S. Cl. .................................. 418/100; 418/178; 418/179; 92/223; 417/DIG. 1

[58] Field of Search ...................... 418/178, 179, 100; 417/DIG. 1, 902; 92/170.1, 223; 184/109

[56] References Cited

U.S. PATENT DOCUMENTS 3,259,307 7/1966 Ayling ................................ 417/902
4,074,956 2/1978 Maruyama et al. ................ 418/178
4,568,252 2/1986 Hattori et al. ...................... 417/269
4,944,663 7/1990 Tizuka ................................ 418/178

FOREIGN PATENT DOCUMENTS 13266 of 1913 United Kingdom .
2074247 10/1981 United Kingdom .

*Primary Examiner*—John J. Vrablik

*Attorney, Agent, or Firm*—Banner, Birch, McKie & Beckett

[57] ABSTRACT

A refrigerant compressor for using HFC 134*a* as a refrigerant and a refrigerator oil such as polyether type oil, polyester type oil, or the like which is compatible thereto is disclosed. The refrigerant compressor has a iron type substrate with a compound layer mainly made of iron sulfide on sliding portions such as sliding parts and shaft in the compression mechanism. The sliding parts in the compression mechanism are a cylinder and a rotor and a piston which are moving parts. In a rotary type compressor, the sliding parts are a blade and so forth. The hardness of the compound layer mainly made of the aforementioned iron sulfide is large and thereby effectively preventing metals from being contacted and preventing adhesive abrasion which is the primary cause of the abrasion of the sliding portions. In addition, since the compound is stable in a moist situation, even if it is used along with polyether type oil, polyester type oil, or the like and HFC 134*a*, corrosion and abrasion due to dissolving of compound layer can be prevented.

3 Claims, 7 Drawing Sheets

HYGROSCOPIC PROPERTY OF EACH LUBRICATING OIL (UNIT: ppm)

| TIME \ OIL | ESTER | POLY-ALKYLENE GLYCOL 1 | POLY-ALKYLENE GLYCOL 2 | POLY-ALKYLENE GLYCOL 2 -MINERAL OIL | CONVEN-TIONAL MINERAL OIL |
|---|---|---|---|---|---|
| 0 | 109 | 335 | 352 | 211 | 29 |
| 24 | 1130 | 2763 | 4496 | 656 | 40 |
| 48 | 1380 | 4039 | 7031 | 1021 | 44 |
| 72 | 1433 | 4393 | 7771 | 1107 | 46 |
| 96 | 1502 | 4802 | 8233 | 1383 | 46 |

NOTE: TEMPERATURE: 25°C HUMIDITY: 70%

FIG. 4

VOLUME SPECIFIC RESISTANCE OF EACH LUBRICATING OIL

| ESTER | POLYALKYLENE GLYCOL | MINERAL OIL |
|---|---|---|
| $10^{13}$ | $10^{10}$ | $10^{14}$ |

COMPRESSOR EXHIBITING AN IRON SULFIDE WEAR SURFACE

This application is a continuation, of application Ser. No. 07/633,993, filed Dec. 26, 1990, abandoned.

BACKGROUND OF THE INVENTION

1. Field of the Invention

The present invention relates to a refrigerant compressor having a protective iron sulfide layer for use with HFC 134*a* as a refrigerant.

2. Description of the Related Art

Refrigeration equipment is used for many domestic and commercial cooling applications. Commonly, such equipment takes the form of room air conditioners, automobile air conditioners, and refrigerators. At its most basic, refrigeration equipment includes a compressor, a refrigeration fluid, and a refrigeration oil. Known compressors include hermetic refrigerant compressors and automobile type semi-hermetic refrigerant compressor.

The compressors all have one or more moving parts which frictionally contact or slide against other parts inside the casing. For example, hermetic, rotary type refrigerant compressors have a motor mechanism and a compression mechanism which are disposed in an hermetic casing. The motor mechanism drives the compression mechanism through a connecting drive shaft.

The compression mechanism is a roller that is rotatably inside a cylinder and connected to the drive shaft off the rotational center of the roller. A blade extends through the cylinder and contacts the outer periphery of the roller so as to divide the inside of cylinder into an inlet chamber and an outlet chamber. By the resilient force of a spring, one end of the blade is maintained in constant frictional sliding contact with the outer periphery of the roller.

The roller orbits around the shaft as the shaft rotates thereby compressing the refrigerant. The compressed refrigerant is discharged into the casing and then via an outlet pipe on the casing to the refrigeration coils.

The primary friction surfaces in the refrigerant compressor are in the compression mechanism. For example, the blade rubs on the inner surface of the hole in the cylinder thereby causing wear on both the blade and the cylinder. In addition, the outer periphery of the spring forcing the blade against the roller also experiences frictional wear. The outer surface of the shaft and the inner surfaces of the frame and the bearing supporting the shaft are likewise subject to wear. Refrigerant oil dispersed in the refrigeration liquid is used to lubricate these surfaces to reduce the effects of friction. Accordingly, the chemical compatibility between the refrigerant and the refrigeration oil is important for achieving adequate lubrication of the friction surfaces. When the sliding parts become sufficiently worn, the performance of the refrigerant compressor is degraded to the point where the compressor must be retired from service. Particularly susceptible to frictional wear are the iron-containing materials commonly used for the compressor elements.

Common refrigerants for the aforementioned refrigerant compressors include dichloro-difluoromethane (hereinafter named CFC 12) and chloro-difluoromethane. Naphthene type mineral oil and paraffin type mineral oil are soluble in CFC 12 or chloro-difluoromethane and have been used as lubricating oils for the chlorofluorocarbon refrigeration systems.

Recent recognition that these chlorofluorocarbons adversely affects the atmospheric ozone have resulted in legislation that will mandate the elimination of chlorofluorocarbon refrigerants. Alternatives to chlorofluorocarbon refrigerants are now starting to be developed. They are not, however, without their drawbacks.

Two of the substitutes for CFC 12 are 1,1,1,2-tetrafluoroethane (hereinafter named HFC 134a) and 1,1-difluoroethane (hereinafter named HFC 152a). The HFC 134a is insoluble in the conventional chlorofluorocarbon refrigerator oils. As a result, polyether, polyester, and fluoride oils are used as lubricating agents. Unfortunately, these oils do not protect against frictional wear as well as the prior materials.

It is considered that wear on the sliding part takes place because the HFC134a and refrigerator oil are hygroscopic and pick up moisture as the compressor is operated. Because the refrigerant and refrigerator oil are directly circulated in the casing, the amount of absorbed moisture continues to increase while the sliding parts become increasingly more worn.

Another factor which contributes to wear inside the compressor is the chemistry of the refrigerant in relation to the iron-containing surfaces of the compressor. When CFC 12 is used as the refrigerant, chlorine atoms in CFC 12 react with iron atoms in the metal substrate throughout the compressor and form an iron chloride film which has high abrasion resistance. When HFC 134a is used, however, the absence of chlorine atoms does not allow the iron chloride layer to form. Compressors with HFC 134a wear faster than when CFC 12 is used.

If deliberate attempts are made to form an iron chloride layer on the compressor surfaces before the compressor is operated, the iron chloride layer is decomposed by water in the refrigerant. The decomposition products include hydrochloric acid which corrodes the compressor surfaces and exacerbates the wear rather than mitigating it. As a result, there exists a need for a method of forming a wear resistant coating on the iron-containing surfaces inside the compressor that is stable against adsorbed water.

Additionally, there is a need for a refrigerant compressor that uses HFC 134a as a refrigerant which has high wear resistance.

SUMMARY OF THE INVENTION

It is an object of the present invention to provide a refrigerant compressor wherein the sliding portions thereof have high abrasion resistance and high durability so the compressor can use HFC 134a as the refrigerant.

In accordance with these and other objectives which will become clear from the description herein, the combination according to the present invention is a compressor using HFC 134a as a refrigerant, wherein the compressor comprises an iron-containing substrate with a wear resistant surface layer consisting essentially of iron sulfide.

With compressors according to the invention, the HFC 134a refrigerant and polyester or polyether lubricating oils can be used with low levels of wear. Such a combination will permit long useful lifetimes with refrigeration systems that are alternatives to the conventional chlorofluorocarbon systems.

BRIEF DESCRIPTION OF DRAWINGS

FIG. 4 is a schematic showing volume specific resistance of each lubricating oil;

DESCRIPTION OF THE PREFERRED EMBODIMENTS

Compressors in the combination according to the present invention are characterized by an iron sulfide layer formed on the iron-containing wear surfaces of the compressor either in a preliminary surface treatment or by the reaction of a sulfur compound dissolved in the refrigeration oil. The iron sulfide layer affords protection against wear despite the differing chemistry of the HFC 134a refrigerant relative to the Freon refrigerants. The iron sulfide layer is hard, stable under high temperatures, and is not decomposed by the presence of moisture in the refrigerant or oil. The high hardness of the iron sulfide layer effectively prohibits contact between wearing iron interfaces thereby reducing wear. It should be noted that the iron sulfide layer need not be formed over all iron-containing surfaces. The wear resistant iron sulfide coating can be applied over only those portions of the moving parts that are subject to high frictional loads.

In the present case, the compressors according to the invention have interrelated iron-containing mechanisms which frictionally engage and cooperate to compress a circulating refrigerant liquid having dispersed therein a refrigerant lubricating oil. The operation of these mechanisms involves friction and relative movements between one or more sliding, rotating, or orbiting parts to effect the compression. In one particular embodiment is a compressor made from a moving member orbiting inside a cylinder. A drive shaft attached to the moving member causes the member to move and compress the refrigerant. A hermetic enclosure seals the compressor and contains a lubricating oil that is compatible with the refrigerant.

The accompanying drawings will help to describe various embodiments of a refrigerant compressor of the present invention.

Figure 1:
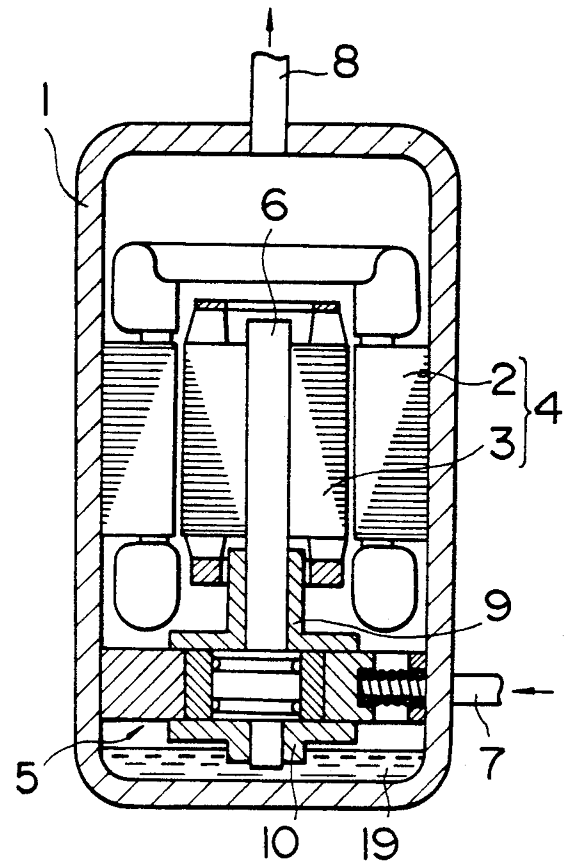
FIG. 1 is a vertical sectional view showing an enclosed rotary type refrigerant compressor according to an embodiment of the present invention.

FIG. 1 is a vertical sectional view showing an enclosed rotary type refrigerant compressor according to an embodiment of the present invention.

In the figure, the reference numeral 1 is an enclosed casing. In the casing 1, a motor mechanism 4 is provided comprising a stator 2 and a rotor 3, which is a drive section. At the lower section of the motor mechanism 4, a compression mechanism 5 is disposed. The motor mechanism 4 and the compression mechanism 5 are connected by a shaft 6. The drive force by the motor mechanism 4 is transferred through the shaft 6 so as to drive the compression mechanism 5.

When the compression mechanism 5 is driven, a refrigerant such as HFC 134a (HFC 134a: 1,1,1,2-tetrafluoroethane) is sent from a supply pipe 7 through an accumulator (not shown in the figure) to be compressed. After the refrigerant is temporarily discharged to the casing 1, it is supplied to the refrigerator through an outlet pipe 8 disposed at the upper section of the casing 1.

Figure 2:
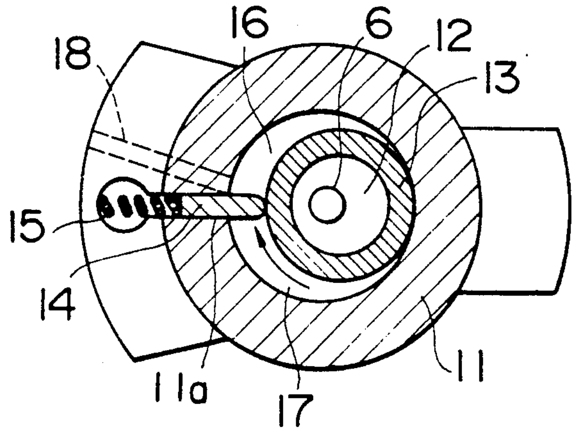
FIG. 2 is a horizontal sectional view showing a compression mechanism of the refrigerant compressor shown in FIG. 1.

Then, by referring to FIG. 2 along with FIG. 1, the compression mechanism 5 will be described in the following.

The shaft 6 which is rotated by the motor mechanism 4 is supported by a bearing of the frame 9. The lower section of the shaft 6 is supported by a sub-bearing 10.

The shaft 6 is disposed so that it pierces through the cylinder 11 of the compression mechanism 5. At the shaft 6 in the cylinder 11, a crank section 12 (eccentric portion) is fixed. Between the crank section 12 and the cylinder 11, a roller 13 is engaged. The roller 13 orbits as the shaft 6 is rotated.

Movable blade 14 extends through cylinder 11. The blade 14 is disposed in hole 11a passing through cylinder 11. The blade 14 is pressed by a spring 15 against the outer surface of roller 13 and moves in accordance with the orbiting motion of the roller 13. One end of the blade 14 is contacted to the outer periphery of the roller 13 by the resilient force of the spring 15 and divides cylinder 11 into an inlet chamber 16 and an outlet chamber 17. Refrigerant is sucked from an inlet port 18 and then compressed in accordance with the orbiting motion of the roller 13 by the rotation of the shaft 6.

Refrigerator oil 19 fills the lower section of the casing 1. The refrigerator oil 19 is sucked by a pump (not shown in the figure) disposed at the lower end of the shaft 6 and lubricates the friction surfaces as the shaft 6 rotates.

The refrigerator oil 19 in the casing 1 should be compatible with HFC 134a. Compatibility is required to prevent refrigerator oil from remaining in the refrigerating cycle and to securely restore the refrigerator oil to the compressor. Because the HFC 134a has high polarity, it is not soluble at all in the conventional mineral oils like paraffin type oil, naphthene type oil, and alkylbenzene.

Lubricating oils useful for the invention include the polyether oils, the polyalkylene glycolether oils, and polyester oils either alone or in admixture with a naphthene type mineral oil, paraffin type mineral oil, or alkylbenzene oil. Fluorine oils are expensive and are not used in great volumes. Indeed, the moisture absorption characteristics of polyether oils can be reduced by using a mixture of a polyether oil and a naphthene type mineral oil, paraffin type mineral oil, or alkylbenzene oil. Polyalkylene glycolether oils are particularly suitable for use as the lubricating oil with HFC 134a refrigerant. This oil has a high viscosity and flow rate even at low temperatures. Polyester oils are characterized by low moisture absorption and high viscosity. FIG. 4 compares the viscosity, also known as the volume specific resistance, for various oils.

The wear portions in the refrigerant compressor are readily identified with reference to the figures. The shaft 6 is exposed to the pressure of the spring 15 and the cylinder 11 through the roller 13 and thereby the shaft 6 is pressed to the frame 9 and the sub-bearing 10. Thus, the shaft 6 is rotated in a slightly curved shape at a high speed. Consequently, the contacting portions between the outer surface of the shaft 6 and the frame 9 and between the shaft 6 and the inner surface of the sub-bearing 10 experience a sliding friction.

Since the blade 14 is contacted with the inner surface of the through hole 11*a* in the cylinder 11 by the pressure difference of the two chambers in the divided cylinder 11, the contacting portion between the blade 14 and the cylinder 11 experiences frictional wear as blade 14 moves through cylinder 11. Blade 14 also contacts and slides over the outside surface of roller 13 which experiences frictional wear. It is on these contact surfaces that the iron sulfide layer is preferably formed to provide a wear resistant surface.

Figures 3, 5:
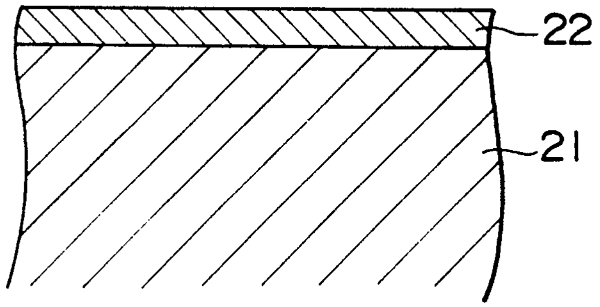
FIG. 3 is a sectional view showing the structure of a sliding wear part using in the refrigerant compressor of the present invention.
FIG. 5 and FIG. 6 are tables showing hygroscopic properties of various lubricating oils for refrigerant systems and water solubilities of various freons.
Figure 6:
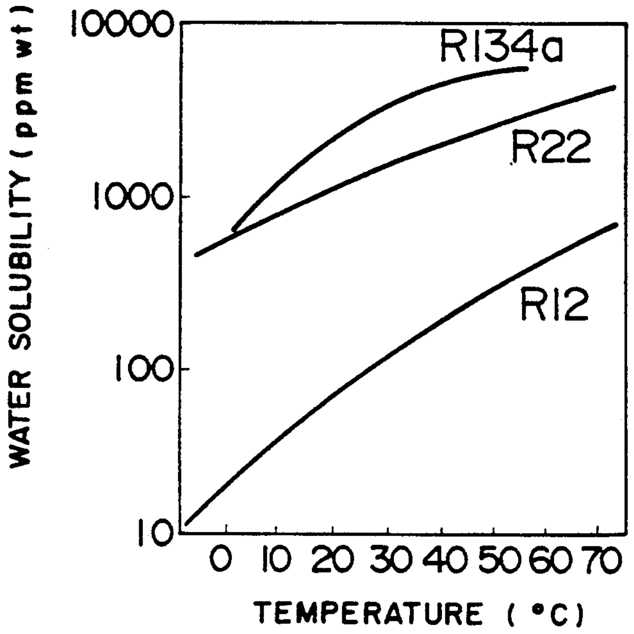

The water solubility of HFC 134a is high. The hygroscopic property of refrigerator oils such as polyether type oil, polyester type oil, and the like is very high. FIGS. 5 and 6 are diagrams showing the hygroscopic property and the water solubility of each lubricating oil, respectively. In conventional chlorofluorocarbon systems, the water solubility of the conventional CFC 12 is low as well as the hygroscopic property of the conventional mineral oil. The iron chloride layer formed on the iron-containing metal substrate surface is so stable that it can prevent abrasion. When HFC 134a and a refrigerator oil which is compatible therewith are used, however, the absorbed moisture is high. Any iron chloride film becomes unstable and ceases functioning as a wear resistant surface.

According to the present invention, an iron sulfide surface layer on the iron-containing metal wear surfaces resists the effects of friction and moisture. The thickness of the iron sulfide layer is desirably about 0.001 μm or more. More preferably, the thickness of the iron sulfide layer is in the range from approximately 0.1 μm to approximately 50 μm. When the thickness of the iron sulfide is 0.001 μm or less, the coating is too thin to remain intact. When the iron sulfide coating is 50 μm or more, the dimensional accuracy of the refrigerant compressor may be decreased.

The iron sulfide coating may contain small amounts of other materials which do not affect the wear resistant properties of the iron sulfide layer. Examples of other materials that may be present in small amounts include phosphorous compounds from the refrigerator oil.

The iron sulfide surfaces may be further coated with a friction reducing layer containing a fatty acid such as stearic acid. This friction reducing layer reacts with iron from the iron-containing compressor surfaces and absorbed water to form an iron soap. This iron soap has a low shear force which results in a slippery coating. The presence of the iron sulfide layer beneath the iron soap layer increases the effectiveness of the lubricating oil.

The iron sulfide layer is preferably formed on, inter alia, the outer surface of the shaft 6, the inner surfaces of the frame 9 and the sub-bearing 10, the outer surface of the blade 14, the inner surfaces of the cylinder 11 and hole 11*a* thereon, and the outer surface of the roller 13. It is not always necessary, however, to form the iron sulfide layer so that it entirely covers the outer surfaces of the shaft 6 and the blade 14. Improvements are seen when the compound layer is substantially formed only at the friction interfaces. Examples of such interfaces include the sliding portion of shaft 6 where it contacts frame 9 and sub-bearing 10 as well as the sliding portion of blade 14 where it contacts hole 11*a* and the tip end of blade 14 which contacts roller 13. The iron sulfide layer can be formed on the entire surface of the wear part or on only part of that surface by masking methods or the like.

The iron sulfide layer can be formed by either of the following methods:

(1) The sliding parts are made of iron-containing substrate. Sulfur is added to a refrigerator oil. While the refrigerant compressor is operated, iron on the surface of the substrate is chemically reacted with sulfur in the refrigerator oil. Thus, the iron sulfide surface layer is formed.

(2) By means of the sulfur penetration process or the like, the iron sulfide surface layer is formed on the surface of the sliding part. As the sulfur penetration process, examples are gas method using a mixed gas of $H_2S$ and $NH_3$; liquid method by adding sulfur or its compound and by means of neutral or deductive salt bathing method; solid method by heating sulfur in a solid agent such as FeS, graphite, or the like in the same method as solid cementation method; and electrolyte method by using an electrolytic solution containing a sulfide.

If the iron sulfide layer is formed by reaction with the lubricating oil, the sulfur compound may be introduced by using an oil conventionally containing a sulfur component as an additive or adding a sulfur component to the oil. Examples of additives containing sulfur are cetyl methyl sulfide, dicetyl sulfide, β, β'-dichloro dicetyl disulfide, cetyl thiocyanate, and dialkyl zinc dithiophosphate. In addition, it is possible to add an additive containing a sulfur component to the oil or dissolve it in polyether oil. In mixed oil systems, it is possible to add sulfur.

Figure 7:
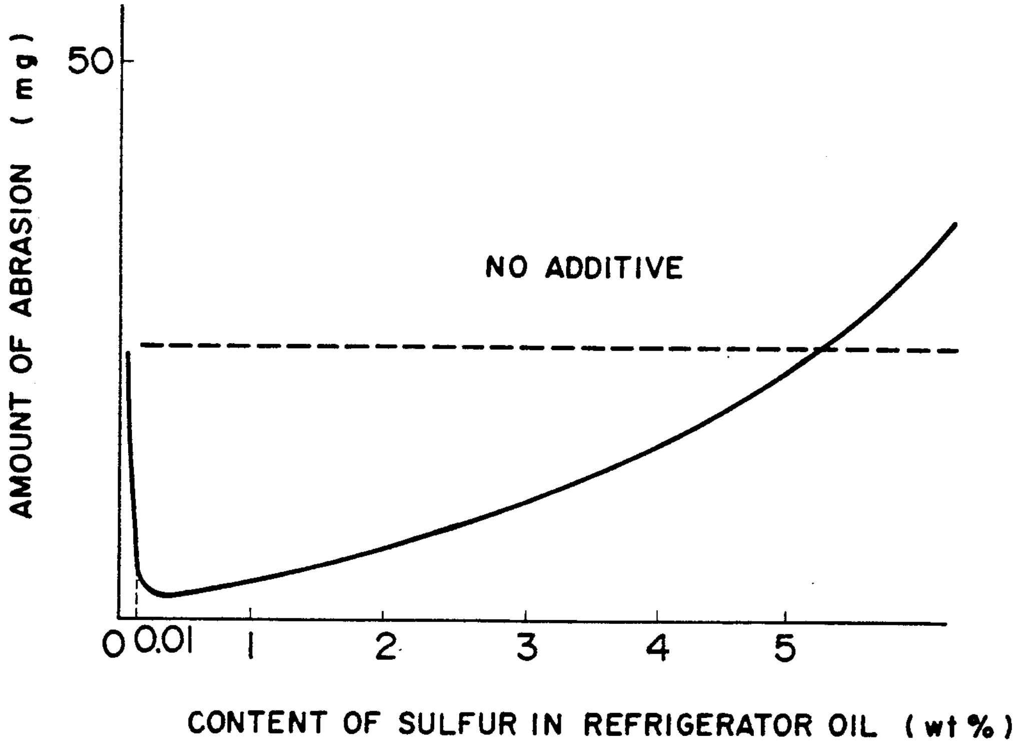
FIG. 7 is a diagram showing the relationship between abrasion resistance and sulfur content.

The preferred final content of sulfur in the refrigerator oil is in the range from 0.01 weight % to 5 weight %. As shown in FIG. 7, when the content of sulfur in the refrigerator oil exceeds 5 weight %, the abrasion resisting ability is decreased. The more effective content of sulfur is in the range from 0.01 weight % to 2 weight %. In addition, it is possible to add in the refrigerator oil a solid lubricating oil (such as molybdenum disulfide, graphite, or the like), sulfur type or halide type extreme pressure additive, or any other lubricant agent to assist in the lubricating effects.

The present invention is conveniently explained with reference to a rotary compressor enclosed with a hermetic enclosure and containing a refrigerant having a refrigerator oil dispersed therein. Please note, however, that the present invention is useful in various types of refrigerant compressors such as a semi-hermetic type refrigerant compressor, reciprocating type refrigerant compressor.

When the compressor is operated with a refrigerator oil containing a sulfur-bearing material, the sulfur-bearing material will react with the frictionally heated compressor surfaces and form the present iron sulfide layer. One example of such a reaction occurs on the drive shaft. As the shaft is rotated, the bearing or the like at which a heavy load is applied becomes locally hot. The refrigerator oil circulating in the refrigerant compressor becomes heated along that hot spot thereby promoting the reaction of the sulfur-bearing agent with the iron in the shaft. This chemical reaction forms a layer consisting essentially of iron sulfide on the surface of the shaft.

The invention is conveniently explained with reference to the following examples.

EXAMPLE 1

Example 1 describes a compressor having an iron sulfide protective layer formed in-situ from the addition of sulfur to the refrigerant oil.

A compressor having the same structure as shown in FIG. 1 was assembled using a shaft 6 of SCM415 material chrome molybdenum steel) which had been degreased with acetone. A refrigerator oil of polyalkylene glycolether type oil containing 0.1 weight % of SP type additive containing sulfur was filled in the casing 1. The refrigerant was HFC 134a (1,1,1,2-tetrafluoroethane), and the refrigerant compressor was operated for 500 hours.

In operation, the eccentric rotation of the shaft 6 applied a high load to the upper and lower edges of each bearing which supports the shaft 6. When the shaft 6 was rotated, the sliding portion became hot and caused the sulfur-containing additive to react at the heated areas. A surface layer consisting essentially of iron sulfide was produced on the shaft.

Figure 8:
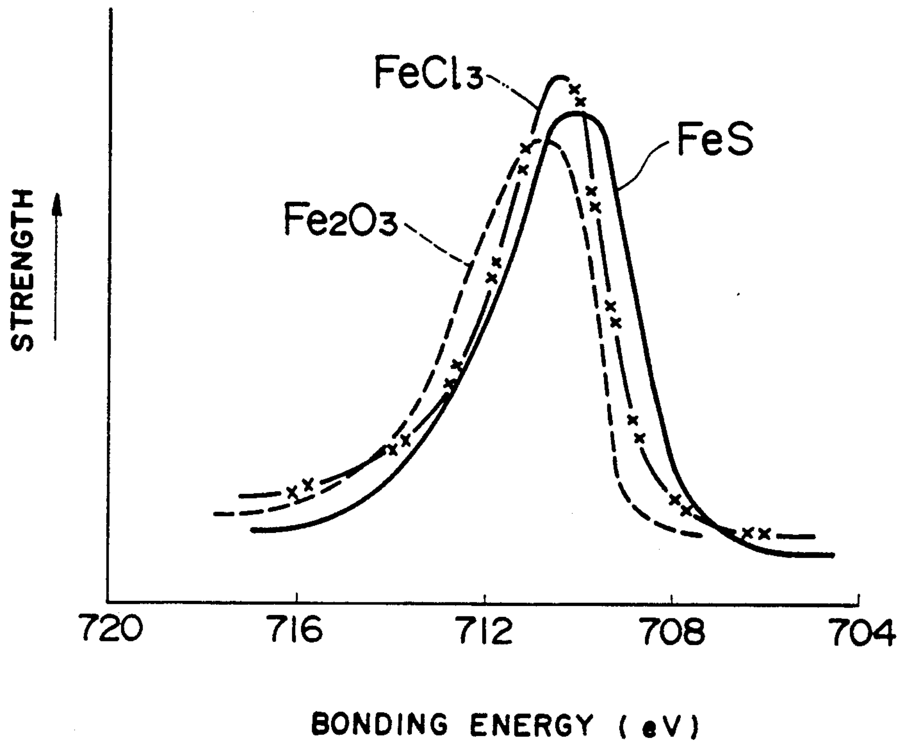
FIG. 8 is a diagram showing the result of X ray photoelectron spectroscopic analysis of the surface of shafts according to one embodiment of the present invention and comparative examples.

For comparison, two compressor having the same type of shaft as example 1 were operated for 500 hours. Comparative example 1 used only polyalkylene glycol as the lubricant. Comparative example 2 used a paraffin lubricating oil. At 500 operating hours, the compounds on the sliding portions of example 1, comparative example 1, and comparative example 2 were analyzed by X ray photoelectron spectroscopic analysis for chemical composition and by scanning electron microscope for signs of wear. FIG. 8 shows the results of the X-ray analyses.

In FIG. 8, the three lines represent the superimposed results of example 1 and the comparative examples. The solid line in the figure represents the result of analysis of example 1. The dashed line in the figure represents the surface analysis of the shaft in comparative example 1. The line with 2 x's is the surface analysis of the shaft in comparative example 2. From the results of the analyses, iron sulfide is formed on the surface of the shaft in example 1. The surface of comparative example 1 formed only a thin iron oxide film, and the shaft surface of comparative example 2 formed only an iron chloride film.

The scanning electron microscope showed barely visible signs of wear on the surfaces of the shafts from example 1 and comparative example 2. On the shaft of comparative example 1 using the polyalkylene glycol, traces of abrasion were clearly observed.

Figure 9:
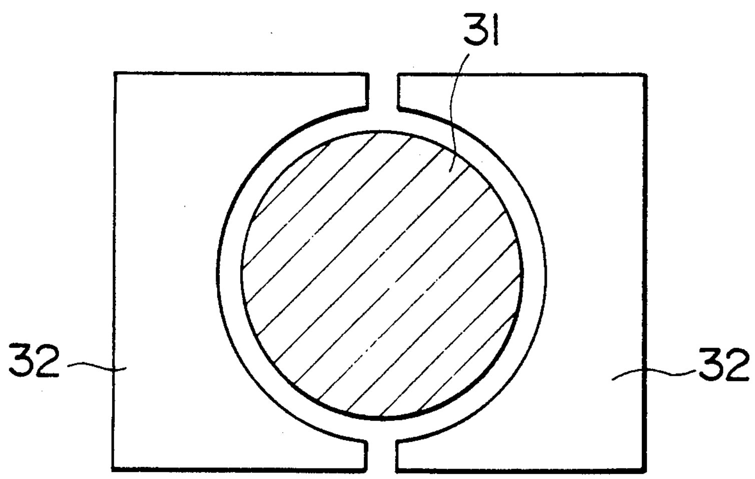
FIG. 9 is a sectional-view outlining the structure of an abrasion test machine used in the embodiment of the present invention.
Figure 10:
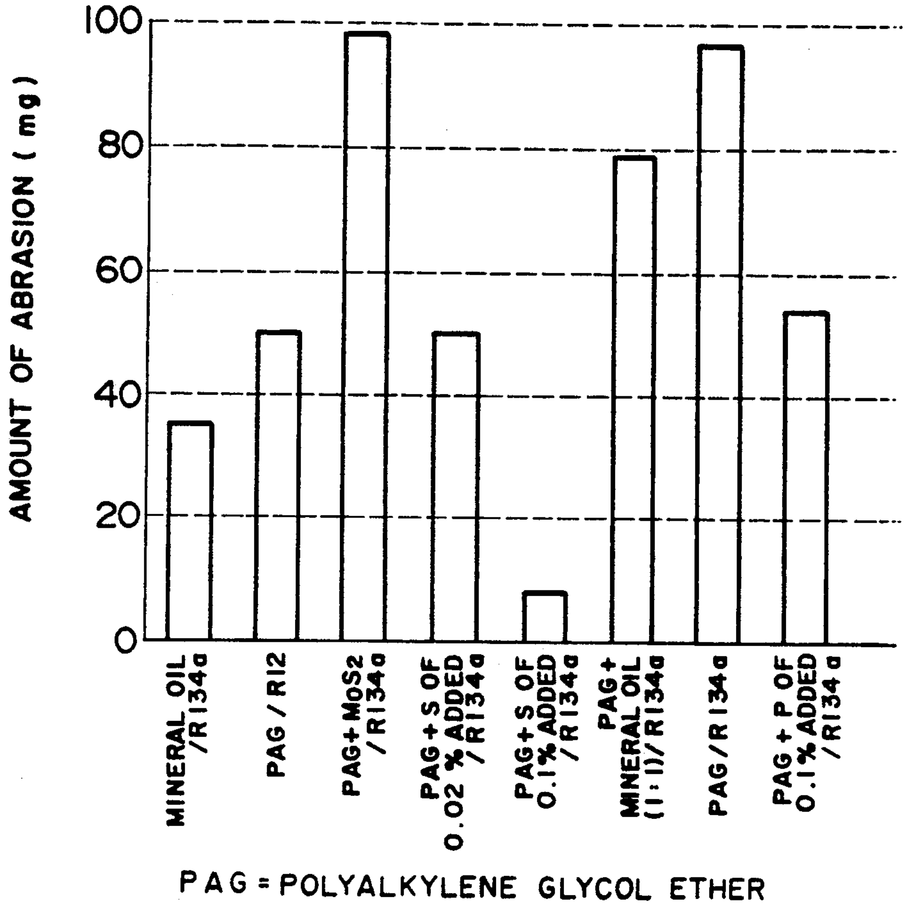
FIGS. 10-13 are graphs showing the results of abrasion tests.

The wear resistance of shafts was quantitatively measured by using an abrasion test machine shown in FIG. 9. In this machine, a shaft 31 is nipped by a pair of V blocks 32. By setting the nipping load of the V blocks 32 to a particular value and rotating the shaft 31, shafts can be subjected to comparable frictional loads which remove measurable quantities of shaft material. In this evaluation, the rotation of the shaft was set to 290 rpm and combinations of refrigerants and refrigerator oils were changed. FIG. 10 shows the results of the evaluation.

As shown in FIG. 10, when only polyalkylene glycol type oil was with HFC 134a, the shaft exhibited one of the two highest wear rates. When 0.1 weight % of sulfur is added to polyalkylene glycol type oil, the resulting formation of an iron sulfide layer over the friction surfaces substantially reduced wear of the shaft (about 97 mg without the addition of sulfur and about 8 mg with added sulfur).

EXAMPLE 2

Example 2 describes the benefits gained from an iron sulfide surface layer formed by a preliminary sulfiding process.

A shaft of SCM415 material which was cut in a particular shape was degreased. Thereafter, the shaft was dipped in a neutral salt bath where the bath composition was 25% of KCN and 75% of $Na_2S_2O_3$ (while a chloride such as NaCl, KCl, $BaCl_2$, or the like was mixed) at a temperature within the range of 180° C. to 200° C. for 10 to 20 minutes. By applying a negative charge to the shaft, a compound layer consisting essentially of iron sulfide having a thickness within the range from 5 to 10 μm was formed on the surface of the shaft.

A comparative shaft was produced without benefit of the electrolysis as a control.

Part of each shaft was analyzed for surface layer composition by X-ray photoelectron spectroscopic analysis (XPS analysis). A surface layer of iron sulfide was formed on the surface of the shaft of the invention.

Figure 11:
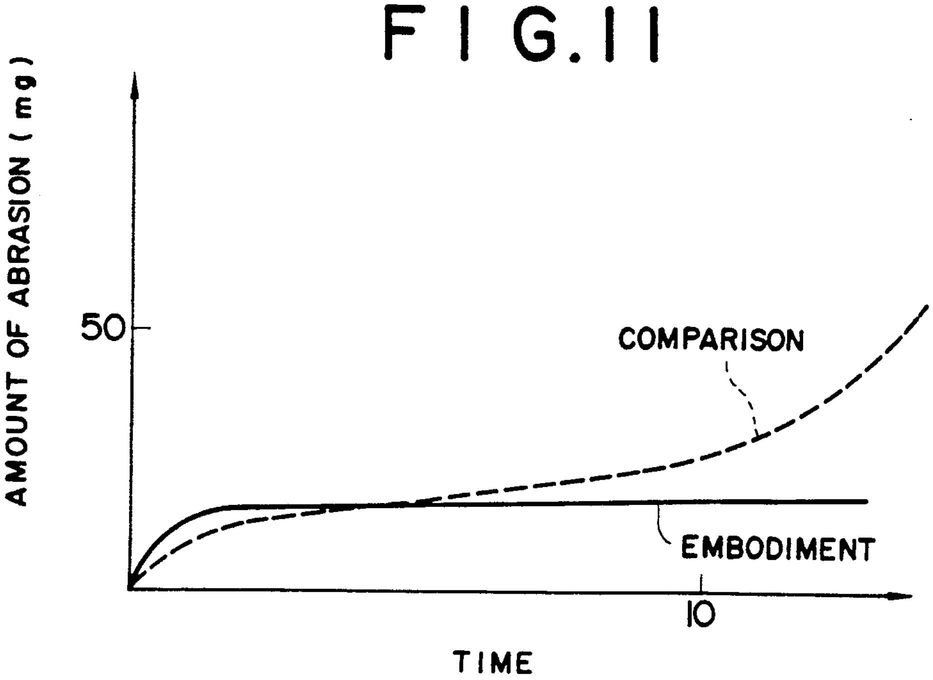

The wear properties of the shaft were evaluated by conducting the abrasion test in the same manner as example 1. FIG. 11 shows the result of the abrasion test. As shown in the figure, the degree of abrasion was initially higher in the shaft containing the iron sulfide layer than the control shaft without the coating. That situation reversed, however, as the amount of abrasion in the treated shaft levelled off and effectively stopped. The control shaft continued to exhibit continually increasing levels of wear.

The shafts were tested under actual operating conditions in a compressor using HFC 134a (1,1,1,2-tetrafluoroethane) and a polyalkylene glycolether oil. The shafts were smoothly rotated at 10,000 rpm. After the test was completed, the surfaces of the shafts were examined with a scanning electron microscope (SEM). Traces of abrasion were barely observable on the shaft of the embodiment. On the comparison shaft, however, abrasion was clearly observed.

EXAMPLE 3

A compressor of the structure shown in FIG. 1 was assembled using a degreased shaft 6 of a SCM415 material. The refrigeration fluid in casing 1 contained HFC 134a (1,1,1,2-tetrafluoroethane) as the refrigerant and 0.1 weight % of a polyester refrigerator oil containing SP type additive such as sulfur or phosphorus. The compressor was operated for 500 hours.

When the refrigerant compressor was operated, the eccentric rotation of the shaft 6 applied a high load to the upper and lower edge portions of each bearing which supports the shaft 6. The shaft rotation and the resulting friction resulted in localized regions of high temperature which promoted the formation of an iron sulfide layer in those regions from the chemical reaction between the iron and the sulfur or phosphorous additive.

Two control compressors were assembled to gauge the effects of the added agents. Comparative example 3 contained only a polyester type oil and the HFC 134a refrigerant. Comparative example 4 used HFC 134a as the refrigerant and a paraffin type refrigerator oil. Both comparative example compressors were operated for 500 hours. The shafts used in the comparisons were the same as that of the embodiment.

After the 500 hour operation period ended, compounds which were produced at the sliding portions on the shafts of the embodiment 3 and the comparisons 3 and 4 were identified by means of X-ray photoelectron spectroscopy. The results were the same as those of example 1. Iron sulfide formed as a layer on the surface of the shaft in example 3. Only a thin iron oxide film was formed on the surface of comparative example 3. An iron chloride layer formed on comparative example 4.

Observation by scanning electron microscope (SEM) revealed traces of abrasion on the surfaces of the shaft from example 3 and from comparative example 4 although abrasion was clearly observed on comparative example 3.

Figure 12:
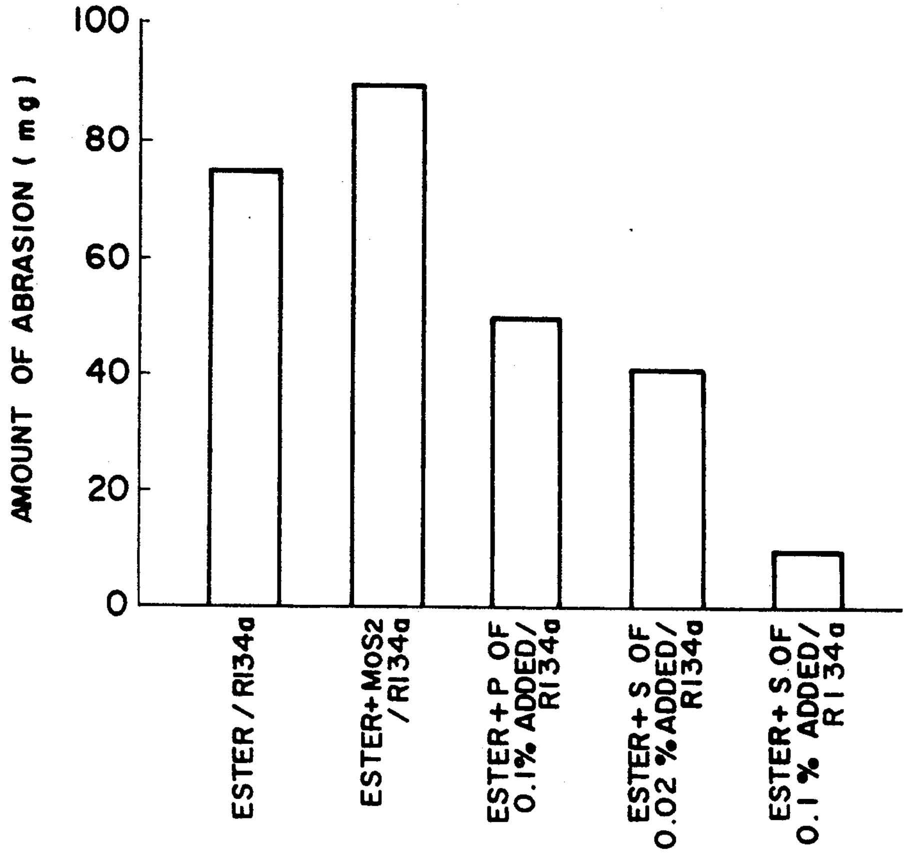

As shown in the abrasion test results of FIG. 12, rotation at 290 rpm with the apparatus of FIG. 9 cause the shaft to exhibit high levels of wear when using a polyester oil either alone or with molybdenum disulfide. When sulfur was added at the rate of 0.02 wt % or 0.1 wt % and allowed to form an iron sulfide layer in situ, the degree of wear experienced dropped substantially.

Thus, it is clear that in the refrigerant compressor using HFC 134a as a refrigerant, sliding parts on which the compound layer mainly made of iron sulfide is effective for improving the abrasion resistance of the compressor and the life of the compressor.

EXAMPLE 4

Figure 13:
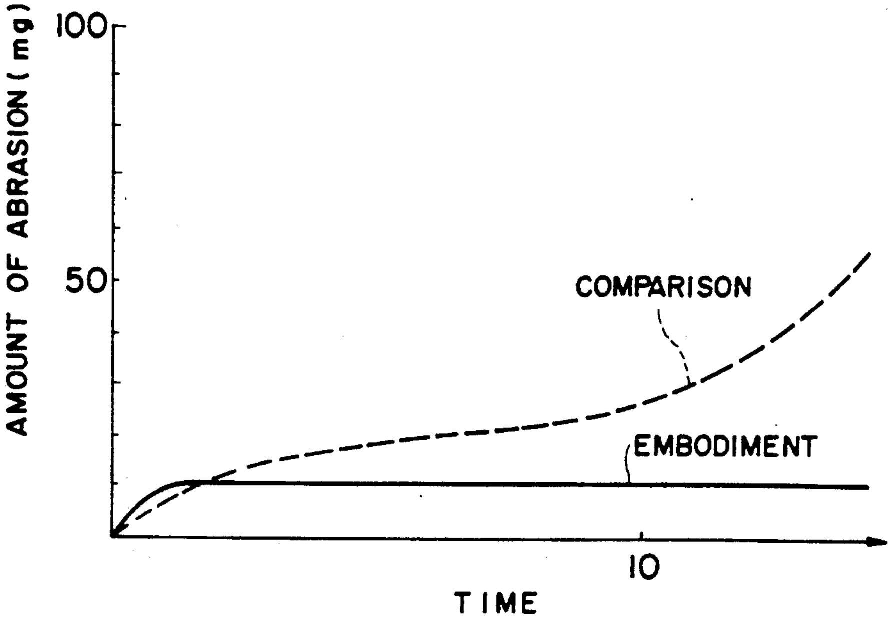

In example 4, a degreased shaft was pretreated as in example 2 to form an iron sulfide layer and subjected to the abrasion test also described in example 2. FIG. 13 shows the result of the abrasion test. As shown in that figure, the treated shaft experienced some initial abrasion but that abrasion levelled off and effectively stopped.

Treated and untreated shafts were then used in the assembly of compressors and operated for a period of time. Each shaft was smoothly rotated at 10,000 rpm. After the test operation was completed, the surfaces of the shafts were observed by means of the scanning electron microscope (SEM). Traces of abrasion were barely observable on the shaft of the embodiment. On the other hand, abrasion was clearly observed on the shaft of the comparative example that did not have the iron sulfide surface layer.

What is claimed is:

1. In combination:

an hermetic type refrigerant compressor comprising an hermetic casing in which a motor mechanism and a compression mechanism are hermetically housed, said refrigerant compressor exhibiting iron-containing surfaces which fictionally move relative to each other wherein said surfaces comprise a layer consisting essentially of iron sulfide;

1, 1, 1, 2-tetrafluoroethane as a refrigerant; and a polyether or polyester refrigerator oil which is soluble in said refrigerant for lubricating said iron-containing surfaces.

2. The combination as set forth in claim 1, wherein the thickness of said iron sulfide layer is in the range from 0.001 μm (gm) to 50 μm (Km).

3. The combination as set forth in claim 1, wherein said refrigerating oil contains sulfur as an additive.

* * * * *